United States Patent
Naus et al.

(10) Patent No.: US 6,500,367 B2
(45) Date of Patent: Dec. 31, 2002

(54) METHOD OF FORMING A SEAMLESS BELT

(75) Inventors: Carl J. Naus, Toronto (CA); Robert S. McCallum, Terra Corta (CA); Sotos M. Theodoulou, Bramalea (CA); Roman P. Badiali, Maple (CA); Paul D. Patcheson, Miss. (CA)

(73) Assignee: Xerox Corporation, Rochester, NY (US)

(*) Notice: Subject to any disclaimer, the term of this patent is extended or adjusted under 35 U.S.C. 154(b) by 130 days.

(21) Appl. No.: 09/749,857

(22) Filed: Dec. 28, 2000

(65) Prior Publication Data

US 2002/0084547 A1 Jul. 4, 2002

(51) Int. Cl.[7] .................. B29C 41/04; B29C 41/20; B29C 41/22
(52) U.S. Cl. .................. 264/39; 264/105; 264/254; 264/255; 264/308; 264/310; 264/311
(58) Field of Search .................. 264/39, 40.7, 104, 264/105, 135, 250, 254, 255, 299, 301, 306, 308, 310, 311

(56) References Cited

U.S. PATENT DOCUMENTS

| | | | | |
|---|---|---|---|---|
| 3,294,889 A | * | 12/1966 | Downie et al. | 101/170 |
| 3,876,510 A | | 4/1975 | Wallin et al. | 204/9 |
| 3,905,400 A | | 9/1975 | DuPree et al. | 138/140 |
| 3,927,463 A | | 12/1975 | Dupree et al. | 29/447 |
| 3,928,036 A | | 12/1975 | Jones | 96/1.5 |
| 3,950,839 A | | 4/1976 | DuPree et al. | 29/447 |
| 3,963,587 A | | 6/1976 | Kreckel | 204/9 |
| 4,033,768 A | | 7/1977 | Wieloch | 96/1.5 |
| 4,098,655 A | | 7/1978 | Ward et al. | 204/38 A |
| 4,501,646 A | | 2/1985 | Herbert | 204/4 |
| 4,711,833 A | | 12/1987 | McAneney et al. | 430/131 |
| 4,747,992 A | * | 5/1988 | Sypula et al. | 249/183 |
| 4,808,364 A | * | 2/1989 | Blunt et al. | 264/310 |
| 4,952,293 A | | 8/1990 | Sypula et al. | 204/180 |
| 5,021,109 A | | 6/1991 | Petropoulos et al. | 156/137 |
| 5,039,598 A | * | 8/1991 | Abramsohn et al. | 346/135.1 |
| 5,064,509 A | | 11/1991 | Melnyk et al. | 204/9 |
| 5,079,121 A | | 1/1992 | Facci et al. | 430/62 |
| 5,100,628 A | | 3/1992 | Griffiths et al. | 427/121 |
| 5,128,091 A | | 7/1992 | Agur et al. | 264/512 |
| 5,221,458 A | | 6/1993 | Herbert et al. | 205/67 |
| 5,258,461 A | | 11/1993 | Facci et al. | 525/165 |
| 5,298,956 A | | 3/1994 | Mammino et al. | 355/275 |
| 5,300,391 A | | 4/1994 | Fabian et al. | 430/127 |
| 5,308,725 A | | 5/1994 | Yu et al. | 430/56 |
| 5,314,779 A | | 5/1994 | Odell et al. | 430/127 |
| 5,409,557 A | | 4/1995 | Mammino et al. | 156/137 |
| 5,413,810 A | | 5/1995 | Mastalski | 427/171 |
| 5,415,961 A | | 5/1995 | Yu et al. | 430/58 |
| 5,445,720 A | | 8/1995 | Sypula et al. | 204/181.1 |
| 5,487,707 A | | 1/1996 | Sharf et al. | 474/253 |
| 5,514,436 A | | 5/1996 | Schlueter, Jr. et al. | 428/57 |
| 5,518,854 A | | 5/1996 | Yu et al. | 430/133 |
| 5,549,193 A | | 8/1996 | Schlueter Jr., et al. | 198/844.2 |
| 5,552,005 A | | 9/1996 | Mammino et al. | 156/157 |
| 5,670,230 A | | 9/1997 | Schluter, Jr., et al. | 428/57 |
| 5,698,358 A | | 12/1997 | Yu | 430/127 |
| 5,709,765 A | | 1/1998 | Herbert | 156/293 |
| 5,721,032 A | | 2/1998 | Parker et al. | 428/57 |
| 5,840,461 A | * | 11/1998 | Haneda et al. | 264/310 |
| 6,217,964 B1 | * | 4/2001 | Ndebi et al. | 156/135 |
| 6,278,858 B1 | * | 8/2001 | Nakazawa et al. | 399/302 |
| 6,393,226 B1 | * | 5/2002 | Charlebois et al. | 399/12 |

* cited by examiner

*Primary Examiner*—Angela Ortiz
(74) *Attorney, Agent, or Firm*—Oliff & Berridge, PLC

(57) ABSTRACT

A method for manufacturing a transfer member suitable for use in an image forming system. A liquid polymer is applied to an internal surface of a rotating drum, spun flat, and cured in place. Additional components of the belt are applied to the rotating mold to form a multi-layered transfer member.

20 Claims, 4 Drawing Sheets

METHOD OF FORMING A SEAMLESS BELT

BACKGROUND OF THE INVENTION

The present invention relates to a method of forming a transfer member in an image forming system. More particularly, this invention relates to a method of manufacturing seamless multilayered transfuse belts for use in the imaging forming system.

In a standard image forming process, a charged latent image is generated by directing an array of charged particles from a print cartridge towards an imaging member. Toner is attracted to the charged latent image on the surface of the imaging member to form a toned image. After the toned image is developed on the imaging member, it is transferred, either directly to paper or to another type of print substrate, or indirectly with a transfer member. To permanently fuse toner onto a print substrate, it is usually necessary to elevate the temperature of the toner to a point at which the constituents of the toner coalesce and become sticky. This heating causes the toner to flow into the fibers of the print substrate. Thereafter, as the toner cools, solidification of the toner causes it to firmly bond to the print substrate. After transfer and fusion of the final image, the residual toner is cleaned from the imaging member (and the transfer member if used).

An example of a prior method of manufacturing a transfer member, such as a seamless belt, for an image forming system is disclosed in U.S. Pat. No. 5,409,557, the contents of which are incorporated herein by reference. In this method, the seamless belt is formed by spraying a coating solution onto a reinforcing member. A thin uniform layer is built up on the reinforcing member by repeated spray passes. After the desired thickness is obtained, the belt is dried, and released from the reinforcing member upon cooling to room temperature.

Other conventional seamless transfer belts are fabricated using compression-type molding. This manufacturing process involves casting rubber onto a mold, applying a heat-shrink wrap, and curing the belt in an autoclave.

There are significant disadvantages to these types of transfer member manufacturing techniques. Using a spray-coating process or a compression molding process, it is difficult to produce a belt having-a-precise and uniform thickness. Before the belt can be used in an image forming system, it is necessary to grind both the spray-coated and the compression molded belt to have the necessary thickness uniformity. This requires precise, complex and expensive post finishing operations to be performed on the belt. Without these operations, the image quality is compromised.

SUMMARY

The present invention provides an improved method of manufacturing seamless belts for an image forming system. This method produces a seamless multi-layered belt having a precise and uniform thickness.

According to one aspect of the invention, the belt is formed by dispensing liquid polymer onto an internal surface of a rotating mold and curing the liquid polymer in situ while the mold still rotates. The present invention includes alternate methods of forming the belt using a liquid polymer in a rotating mold. In one embodiment, the belt is formed by applying a conductive layer to the rotating mold, followed by a liquid polymer layer and a fabric backing. In an alternate embodiment, the belt is formed through a reverse method, and then inverted.

Both embodiments provide a simplified method of manufacture while producing a superior end product. This invention constructs seamless belts that are usable when they are cast, without the need for post-finishing operations to achieve the essential thickness requirements.

In one embodiment of the invention, a transfer member suitable for use in an image forming system is manufactured by applying liquid polymer to a rotating mold and curing the liquid polymer.

According to an alternate embodiment, a transfer member is formed by dispensing a conductive coating to an internal surface of a rotating mold, followed by an application of a first liquid polymer coating to the mold. The conductive coating and the first liquid polymer coating are cured to an intermediate stage. A second liquid polymer coating is applied to the cured liquid polymer, followed by application of a support material to form a stacked structure. A heavy elastomeric liner, which either does not bond to the liquid polymer or has a release agent on its surface, is inserted into the mold and the stacked structure is cured to a final stage while the mold is rotating. The elastomeric liner and the stacked structure (the transfer member) are removed from the mold.

In yet another embodiment, a transfer member is formed by first dispensing a thin coating of liquid polymer to an internal surface of a rotating mold, followed by application of a support material. A heavy elastomeric liner, which does not adhere to the curing rubber, is optionally inserted in the mold. The liquid polymer and the support material are cured to an intermediate stage while the mold rotates. A second liquid polymer coating is applied to the rotating mold, and a conductive coating is applied to the second liquid polymer coating to form a stacked structure. The stacked structure is cured to a final stage, removed from the mold and inverted.

DETAILED DESCRIPTION OF THE PRESENT INVENTION

As used herein, the phrase "transfer member" is intended to include any suitable member for transferring, conveying or transmitting a toned image in an image forming system. An image forming system includes image development and transfer systems comprising an assemblage of operatively associated image forming elements for depositing a latent image onto a receiving member, developing the image, and then transferring the developed image onto a substrate. A transfer member is often a seamless belt comprised of flexible rubber. Examples include transfer, transfuse and transfix belts. In the illustrative embodiment, the transfer member is a transfuse belt, which is employed in an image forming system to simultaneously transfer and fuse a toned image to a print substrate in a single step.

Figure 1:
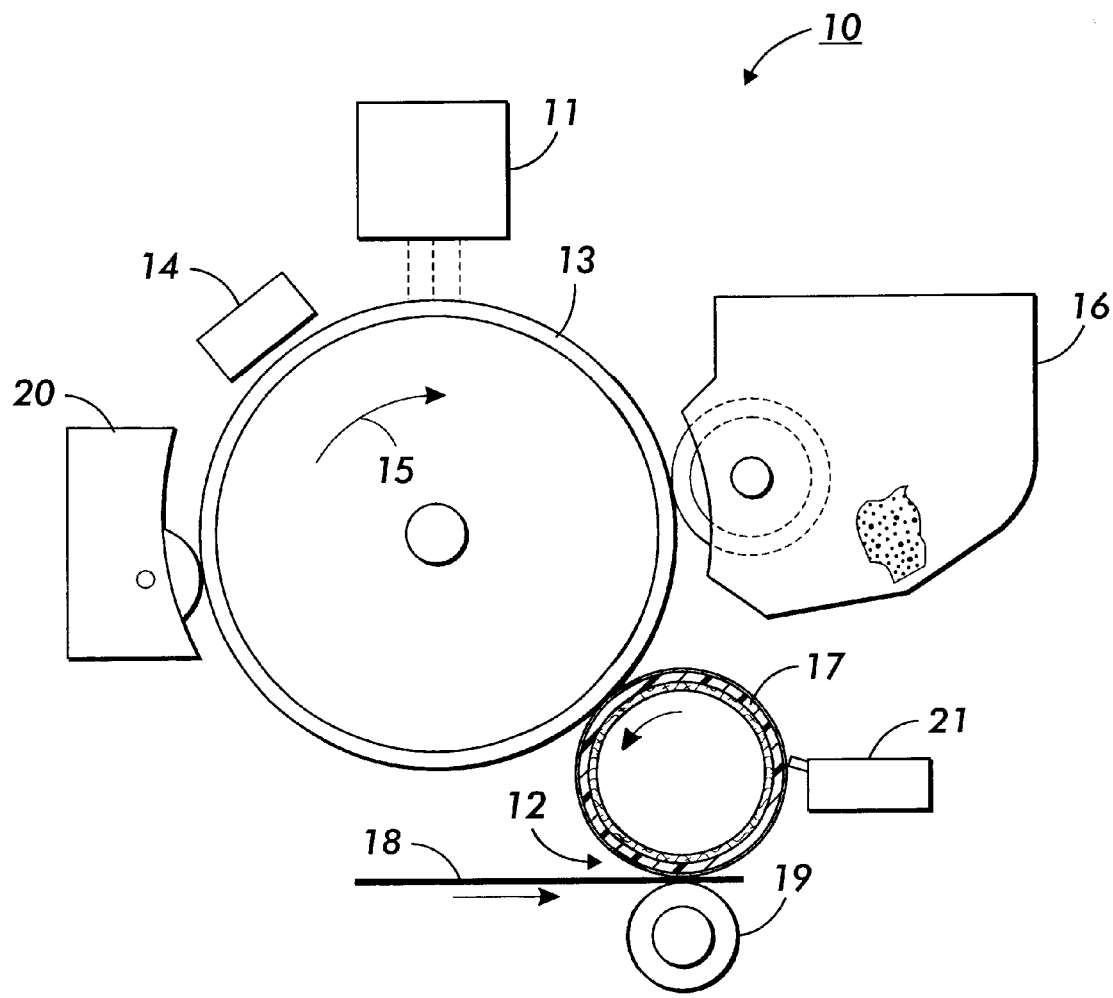
FIG. 1 is a schematic illustration of one type of image forming system suitable for employing the transfer member of the present invention.

FIG. 1 illustrates an image forming system, such as an ionographic print system 10, in which the seamless transfer member 17 of the invention is employed. It is to be understood that the present invention is not limited to the particular embodiment illustrated in FIG. 1 or to the particular application shown therein. The invention may also be used to produce a transfer member for other types of image forming systems. An image forming system may be an ionographic, electrographic, electrophotographic, ink jet, or other similar system that is adapted to capture, store and/or reproduce image data associated with a particular object, such as a document.

In the illustrated image forming system, a latent image of an original image to be copied is recorded upon an imaging member and subsequently developed into a visible image by the application of toner. A print cartridge 11 generates and directs a collection of charged particles, such as electrons, towards an imaging member 13. A neutralizer 14 first neutralizes the surface of the imaging member 13. An exemplary imaging member may be an aluminum drum with an anodized surface (a dielectric surface) that rotates in a selected direction, indicated by arrow 15. The charged particles form a latent image on the imaging member 13. The latent image is developed into a toned image when exposed to toner at a developing station 16. The charged areas of the latent image attract the toner particles, which are deposited on the imaging member 13 in image configuration. After the toned image develops on the imaging member 13, it is brought into contact with a transfer member, depicted as a transfuse belt 17 in this embodiment. This belt is kept at about 150° C., in order to melt the toner particles and promote complete transfer of the toned image from the imaging belt 13 to the transfuse belt 17.

The toned image is subsequently transferred to a print medium or substrate, such as paper 18, by passing the paper 18 through a nip 12 formed between a pressure roll 19 and the transfuse belt 17 containing the toned image. At the same time, the image is permanently fused to the paper 18 through a combination of heat and pressure. In order to enhance transfer and fusion, the paper and/or the pressure roll may also be heated. Both the imaging belt and the transfuse belt loop back past cleaning stations 20, 21 in order to remove excess toner.

Figure 2:
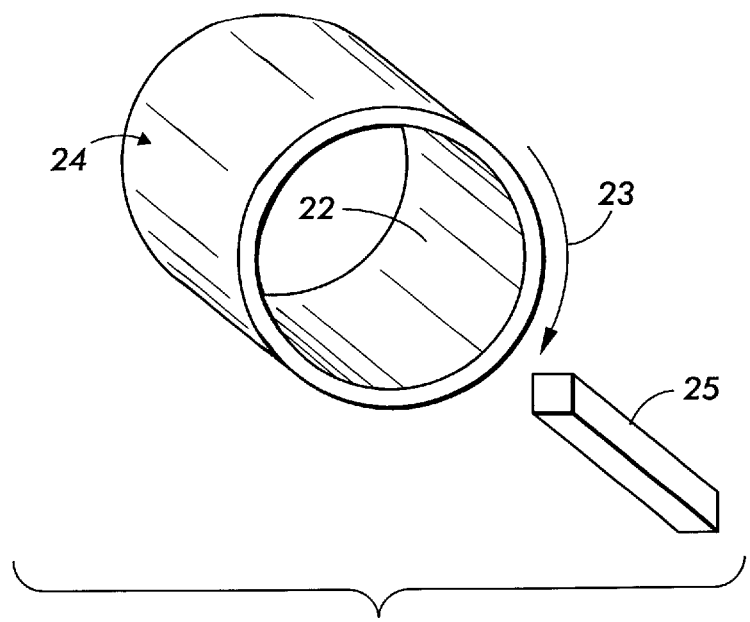
FIG. 2 is a perspective view of a rotating drum and dispensing arm used according to the teachings of the present invention to form the transfer member of the invention.

The present invention involves an improved method of manufacturing a transfer member, such as a transfuse belt, by forming the member in a rotating mold. Two methods can be employed to form the transfer member. Both methods involve applying a liquid polymer and other components of the transfer member to a rotating mold, as illustrated in FIG. 2. The mold can be a cylindrical drum 24 that is rotated about its longitudinal axis at various speeds. A dispensing arm 25 distributes liquid polymer and other layers that comprise the transfer member to an interior surface 22 of the rotating drum 24. The drum rotates in a direction indicated by the arrow 23 while the elements that comprise the transfer member are dispensed to the interior surface 22. The drum rotates at a slow rate for dispensing the polymers and faster rates of up to about 2500 revolutions per minute (RPM) for spinning the polymers to a uniformly flat form during the manufacturing process.

It is desirable for a transfuse belt or other transfer member to have excellent electrical, chemical and mechanical properties in order to enable good transfer and fix of the image and to provide a high quality image. A seamless belt of uniform thickness is ideal, as a uniform thickness reduces discontinuities in the final image. A uniform thickness also extends the usable life of the belt by decreasing potential weak points and promoting even wear. The transfer member also provides uniform heating throughout the surface of the member, to maintain a desired temperature and to evenly heat the toner. It is important that the transfer member surface has excellent release characteristics with respect to the toner particles, in order to reduce toner offset. Toner offset occurs when the heat-softened toner particles adhere to the surface of a transfer or fuser member, rather than the print substrate. This produces an inferior copy quality, stray marks on the copy, and potential toner contamination of other parts of the image forming system. The transfer member ideally has a smooth surface so that discontinuities in the final image do not occur. In order for the transfer member to be capable of imaging on a wide variety of substrates, the transfer member is usually comprised of a flexible rubber. The compliance of the rubber enhances image transfer and fusion by increasing the contact area between the transfuse member and the paper.

Figure 3:
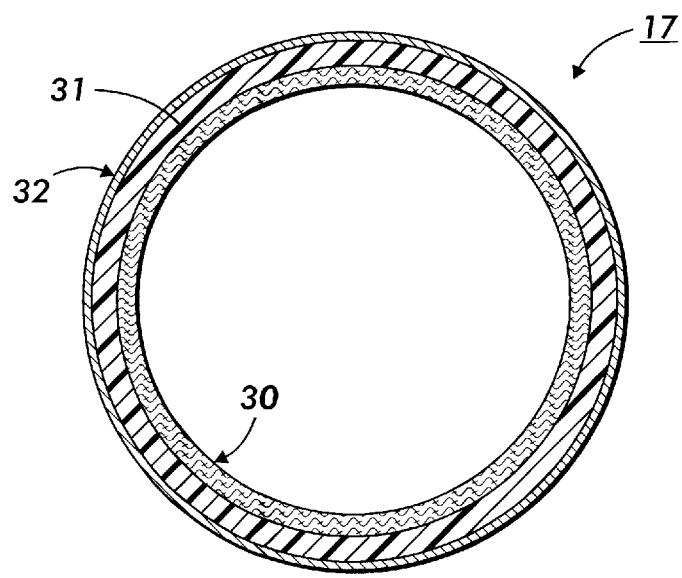
FIG. 3 is an illustration of a transfer member for an image forming system that is manufactured according to the teachings of the present invention.

The layers of the transfer member manufactured according to the teaching of the present invention are illustrated in detail in FIG. 3. In the illustrative embodiment, the transfer member is a transfuse belt 17. As discussed, the manufactured belt has a uniform thickness to ensure a high-quality final image. The illustrated belt 17 includes a support structure 30, a dielectric layer 31 and an outer conductive layer 32. The support structure 30 can be any suitable structure for providing support, such as a fabric carcass backing. The fabric material suitable for the support structure 30 can be exposed to high operating temperatures and has high mechanical strength. Ideally, the fabric substrate has a flexural strength of from about 2,000,000 to about 3,000,000 psi, and a flexural modulus of from about 25,000 to about 55,000 psi. A preferred fabric is a polyamide, such as NOMEX®, available from E. I. DuPont of Wilmington, Del. Other suitable fabrics for the support structure include woven or nonwoven cotton fabric, graphite fabric, fiberglass, woven or nonwoven polyimide, for example KEVLAR® also available from DuPont, polyester, polyacryl, polyethylene, polypropylene, and the like.

An intermediate layer 31 is located on top of the support structure 30. This layer generally has good dimensional stability, and is flexible and conformable to a print substrate, such as paper. The intermediate layer 31 provides thermal stability for transfuse applications, where the temperature of the transfer member is elevated to about 150° C. In addition, the layer is highly resistant (chemically stable) to toner and developer materials. A material with low surface energy properties provides ready release of the toner onto the print substrate to reduce toner offset. This enables a high efficiency transfer of the toned image to most substrates. A high elastic modulus material, such as a silicone rubber material, is an appropriate material for this layer, as it provides the desired properties.

The outer surface layer 32 of the belt is a conductive layer. This layer is the portion of the belt that contacts the toner and conveys the toned image from the imaging member to the print substrate. Therefore, the material that comprises this layer is static dissipative and efficiently conducts heat in order to sufficiently melt the toner. Examples of suitable electrically conducting material include carbon black, tin oxide, ionically conducting polymers, and metals like gold silver, copper, and nickel. In the preferred embodiment of the present invention, this layer is formed with a carbon black liquid silicone.

As discussed, it is important that the transfer of the toner particles from the transfuse belt or other transfer member to a print substrate or other image receiving member be substantially 100 percent. Less than complete transfer to the print substrate results in image degradation and low resolution. While the silicone rubber layer provides good release properties, an additional release agent material (not shown), such as silicone polymer release agent material, may be applied to the transfuse belt to enhance the release properties of the belt.

Prior to formation of the transfer member using the rotating mold illustrated in FIG. 2, an optional preliminary step of preparing the internal surface 22 of the rotating mold 24 can be taken. This involves either precisely machining the surface 22, or creating a liner for the mold 24. This liner is made by spinning a liquid polymer in the mold 24, and curing the liquid polymer solid while spinning. This step creates a smooth, hard surface for the belt to be formed upon. The cured liquid polymer used to make the liner does not affect the cure of the polymer used in the construction of the transfer member. A suitable material for this liner is an epoxy material. In an alternate embodiment, the interior surface 22 of the mold 24 can be adjusted to provide a desired surface roughness on the transfer member. The mold is also balanced to reduce vibrations during construction of the transfer member.

Figure 4:
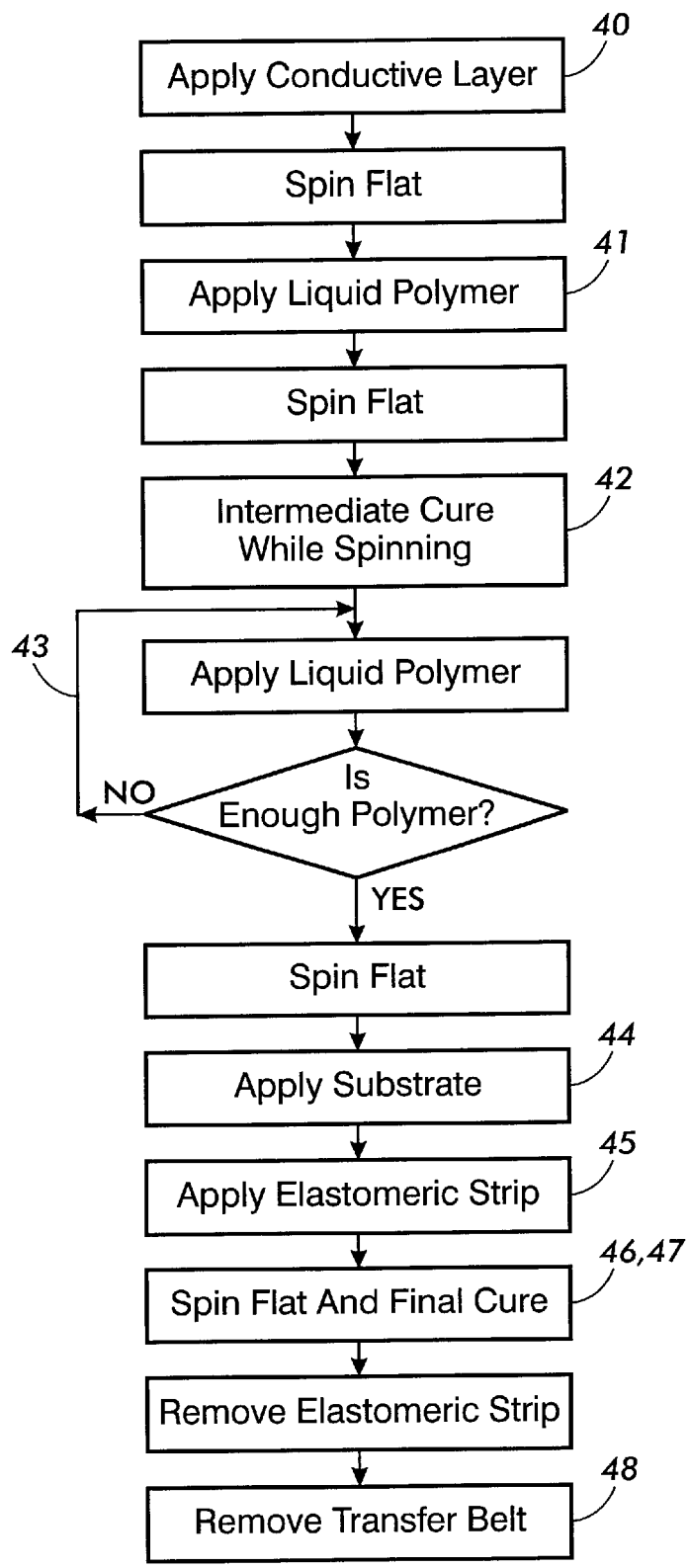
FIG. 4 is a schematic flowchart diagram showing a first method of manufacturing a seamless multi-layered transfer member.

The first method of forming the transfuse belt 7 of FIG. 3, or another transfer member, is schematically illustrated as a flow-chart in FIG. 4. After the surface 22 of the drum 24 is prepared, a first coating is dispensed on the surface 22 of to the rotating drum 24 (step 40). This first coating forms the outer conductive surface layer of the belt. As the surface layer is the portion of the belt that contacts the toner, the layer is static dissipative and conducts heat in order to melt the toner. According to one practice, this layer employs a carbon black liquid. After the first layer is evenly distributed on the drum surface 22, it is spun flat by rotating the mold 24. After the conductive layer is spun, a first layer of liquid polymer is applied to the conductive layer and spun flat as well (step 41). According to one practice, the liquid polymer is a liquid silicone rubber, which provides flexibility and compliance to the belt, as well as good release properties. Other suitable materials include urethane, fluorosilicone and other elastomeric liquid compounds.

Each layer is applied according to a predetermined dispense rate, defined as the rate at which each liquid component is applied to the rotating mold 24. This rate depends upon the viscosity of the liquid that is being applied and the speed at which the mold rotates. For example, the liquid carbon black layer is ideally applied to the surface 22 of the rotating mold 24 at a rate of about three grams per second when the drum is rotating at 200 RPM. The liquid silicone rubber is applied at a rate of one gram per second when the drum is rotating at 200 RPM. The various dispensed layers are spun to a uniformly flat form by rotating the mold 24 at a significantly faster rate of up to 2500 RPM.

The construction is then cured to an intermediate solid stage (step 42) while the mold rotates between about 1000 and 2500 RPM. The curing time and cure temperature for this intermediate cure vary according to the type of silicone rubber or other polymer that is used. For most applications, the intermediate cure temperature is about 150° C., and can vary between about room temperature (32° C.) for certain silicone rubbers, and about 175° C. The intermediate curing time varies between about 2 and about 20 minutes. The intermediate cure does not fully solidify the layers, but makes them hard to the touch. After the intermediate cure, the hardened silicone rubber or other polymer surface is sanded down to prepare for additional liquid polymer to be added to the construction. A preferred material in this step is liquid silicone rubber. This additional polymer may comprise several layers of liquid polymer. Each layer is distributed on the previously formed layers, and spun flat before a subsequent layer is applied (step 43). The polymer is applied in enough layers to form a polymer layer of a thickness sufficient to form a conformable layer. According one practice, the thickness of the silicone rubber layer is between about 1.6 millimeters and about 2 millimeters.

A fabric carcass backing is then applied to the uncured liquid polymer (step 44). As discussed, this fabric carcass backing is composed of an aramid fiber fabric such as NOMEX®, which is manufactured by Dupont. This backing is the support structure for the transfuse belt. The fabric of the backing is pre-treated prior to applying the backing to the polymer layers on the mold. The fabric is first wetted with water, and then stretched tight on a stretcher having a larger diameter than required in the final product. The wet fabric is then placed in an oven at 200° C. to dry. The fabric is then re-soaked, and the diameter of the stretcher is set to the diameter required for the mold. The wet fabric is again placed in an oven at 200° C. to dry. The fabric is shrunk to a given size, in order that the circumference of the backing matches the internal circumference of the mold at the intermediate.stage. After the fabric carcass backing is applied to the layers of uncured polymer, a solid thick elastomeric strip is pressed onto the backing, in order to fuse the fabric of the backing with the liquid polymer or, if the carcass is less dense than the liquid polymer, to "submerge" the carcass into the liquid polymer (step 45). This elastomeric strip is of uniform thickness and preferably comprised of silicone rubber. A release agent may be coated on the outside surface of the strip to ensure a clean separation of the elastomer strip from the fabric backing. The multi-layered structure, comprised of the conductive layer, the polymer layers, and the support layer, is spun again (step 46) and cured (step 47) in place. The cure of step 47 is a final cure to completely solidify and finalize the multi-layered structure. Again, the exact curing time and temperature depend upon the type of silicone rubber or other polymer used. In most situations, the final cure varies between 32° C. and 180° C. and lasts between 1 and 2 hours. An inhibitor may be used to prevent the rubber from curing until heat is applied. Finally, the elastomeric strip is removed from the mold followed by the multi-layered belt (step 48). The multi-layered belt is ready for use in an imaging system.

There are many variations that may be made to the process of forming a transfer member described above. According to one practice, the elastomeric strip is removed from the belt prior to the final cure. In an alternate embodiment, the elastomeric strip remains joined to the construction during the final curing stage. In another embodiment, additional layers of liquid polymer-are applied to the backing before application of the elastomeric strip.

Figure 5:
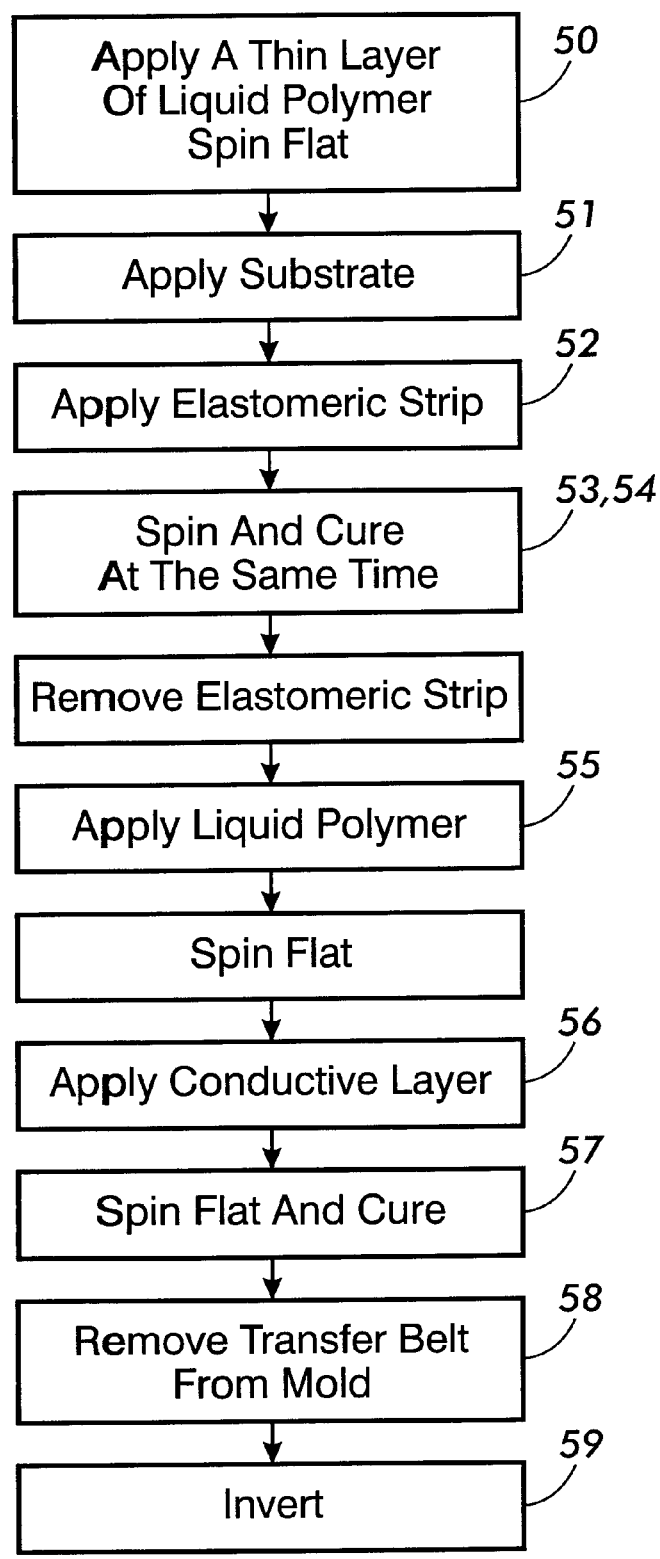
FIG. 5 is a schematic flowchart diagram showing an alternate method of manufacturing the transfer member of the present invention.

A second construction method, illustrated in FIG. 5, produces a transfuse belt or other transfer member that is similar in form to the belt produced by the method illustrated in FIG. 4. In this case, the belt is produced by a reverse method, using identical materials, and is then inverted at the end of the process.

This method also includes the optional preliminary step of preparing the surface 22 of the rotating drum 24 prior to beginning the formation process, as discussed above. In the first step of the formation process, a thin layer of liquid polymer is spread on the interior surface 22 of the rotating drum 24 and spun flat (step 50). The fabric carcass backing is then inserted into the mold and pressed onto the liquid polymer layer (step 51). As discussed above, the fabric backing is pre-treated and sized to match the internal circumference of the rotating mold 24 at this stage in the process. An elastomeric strip is inserted and pressed against the backing to fuse the fabric of the backing with the liquid polymer (step 52). The construction is spun (step 53) and cured to an intermediate stage (step 54). This intermediate cure is sufficient to somewhat harden the liquid polymer. The range of time and temperature are similar to the time and temperature of the intermediate cure of step 42 in FIG. 4. The elastomeric strip is then removed. Next, additional layers of liquid polymer are applied and spun flat (step 55), followed by application of the liquid carbon black conductive layer (step 56) to the multi-layered structure. The multi-layered structure is then cured to a final stage (step 57), with the same range of curing time and temperature as step 47 of FIG. 4 while the mold rotates at a high RPM. Finally, the formed belt is removed from the mold (step 58) and inverted (step 59), so that it has the same form and shape as the belt formed from the process illustrated in FIG. 4.

A multi-layered belt formed through the above-described processes produces superior print quality and printer performance. All layers of the belt are of uniform thickness, and the properties of the belt are consistent throughout. In the described methods, the conductive surface layer will have uniform conductivity for each point in the belt, leading to uniform heating of the toner. There are few discontinuities in the belt, reducing stray marks and irregularities in the final image. In addition, the invention streamlines the manufacturing process, leading to significant savings in both cost and time.

While the invention has been described in detail with reference to an illustrative embodiment and application, those skilled in the art will appreciate that various modifications and variations may be made without departing from the intended scope of the present invention as defined in the appended claims.

What is claimed is:

1. A method of forming a transfer member suitable for use with an image forming system, comprising
   dispensing a first coating of liquid polymer into a rotatable mold;
   rotating the mold;
   curing the liquid polymer;
   dispensing a second coating of liquid polymer onto the cured liquid polymer;
   applying a support material to the second layer of liquid polymer;
   applying an elastomeric material to the support material in order to fuse the support material with the second layer of liquid polymer to form a stacked structure;
   curing the stacked structure to a final stage; and
   removing the stacked structure from the mold.

2. The method of claim 1, further comprising the step of forming a conductive layer on an internal surface of the rotatable mold prior to the step of dispensing the first coating of liquid polymer.

3. The method of claim 1, prior to the curing step, further comprising the steps of
   dispensing one or more additional layers of liquid polymer;
   performing an intermediate cure; and
   dispensing one or more additional layers of liquid polymer.

4. The method of 1, and further comprising the step of preparing an interior surface of the rotatable mold prior to dispensing the liquid polymer.

5. The method of claim 4, wherein the step of preparing comprises the steps of:
   applying a liquid polymer liner to the interior surface of the rotatable mold; and
   curing the liquid polymer liner to a solid state while spinning.

6. The method of claim 4, wherein the step of preparing comprises the step of modifying the surface of the rotatable mold to a predetermined surface roughness.

7. The method of claim 1, further comprising the step of applying the liquid polymer and the conductive layer at a predetermined rate, based on the viscosity of the material and the speed of the rotatable mold.

8. The method of claim 1, further comprising the step of pre-treating the support material.

9. The method of claim 1, wherein the second liquid polymer coating comprises a plurality of layers.

10. The method of claim 1, wherein the liquid polymer is a liquid silicone rubber, the conductive layer is formed of carbon black liquid, and the support material is a polyamide.

11. The method of claim 1, wherein the mold rotates at a speed of up to 2500 revolutions per minute.

12. A method of forming a transfer member suitable for use with an image forming system, comprising:
    applying a conductive coating to an interior surface of a rotatable mold while the mold rotates;
    applying a first liquid polymer coating to the conductive coating while the mold rotates;
    curing the conductive coating and the liquid polymer coating to an intermediate stage while the mold rotates;
    applying a second liquid polymer coating to the cured first liquid polymer coating while the mold rotates;
    applying a non-liquid support material to the second liquid polymer coating to form a multi-layered structure;
    curing the multi-layered structure to a final stage; and
    removing the cured multi-layered structure from the mold.

13. The method of claim 12, further comprising a step of applying an elastomeric material to the support material in order to fuse the support material with the second liquid polymer coating.

14. The method of claim 12, wherein the first liquid polymer coating comprises a plurality of layers of liquid polymer.

15. The method of claim 14, wherein the second liquid polymer coating comprises a plurality of layers of liquid polymer.

16. The method of claim 12, further comprising a step of applying a third liquid polymer coating to the support material.

17. A method of forming a transfer member, suitable for use with an image forming system, said method comprising:
    applying a thin coating of liquid polymer to an internal surface of a rotatable mold while the mold rotates;
    applying a support material to the thin coating of liquid polymer while the mold rotates;
    curing the thin coating of liquid polymer and the support material to an intermediate stage while the mold rotates;

applying a second liquid polymer coating to the support material while the mold rotates;

applying a conductive layer to the second liquid polymer coating while the mold rotates to form a multi-layered structure;

curing the multi-layered structure to a final stage while the mold rotates;

removing the cured multi-layered structure from the mold; and inverting the multi-layered structure.

18. The method of claim 17, further comprising a step of applying an elastomeric material to the support material in order to fuse the support material with the thin coating of liquid polymer.

19. The method of claim 17, wherein the second liquid polymer coating comprises a plurality of layers of liquid polymer.

20. The method of claim 17, wherein the liquid polymer is a liquid silicone rubber, the conductive layer is comprised of carbon black liquid, and the support material is a polyamide.

* * * * *

UNITED STATES PATENT AND TRADEMARK OFFICE
CERTIFICATE OF CORRECTION

PATENT NO.    : 6,500,367 B2
DATED         : December 31, 2002
INVENTOR(S)   : Carl J. Naus et al.

It is certified that error appears in the above-identified patent and that said Letters Patent is hereby corrected as shown below:

<u>Title page,</u>
Item [75], delete "Roman" substitute -- Romano --

Signed and Sealed this

Ninth Day of September, 2003

JAMES E. ROGAN
*Director of the United States Patent and Trademark Office*